Patented July 10, 1928.

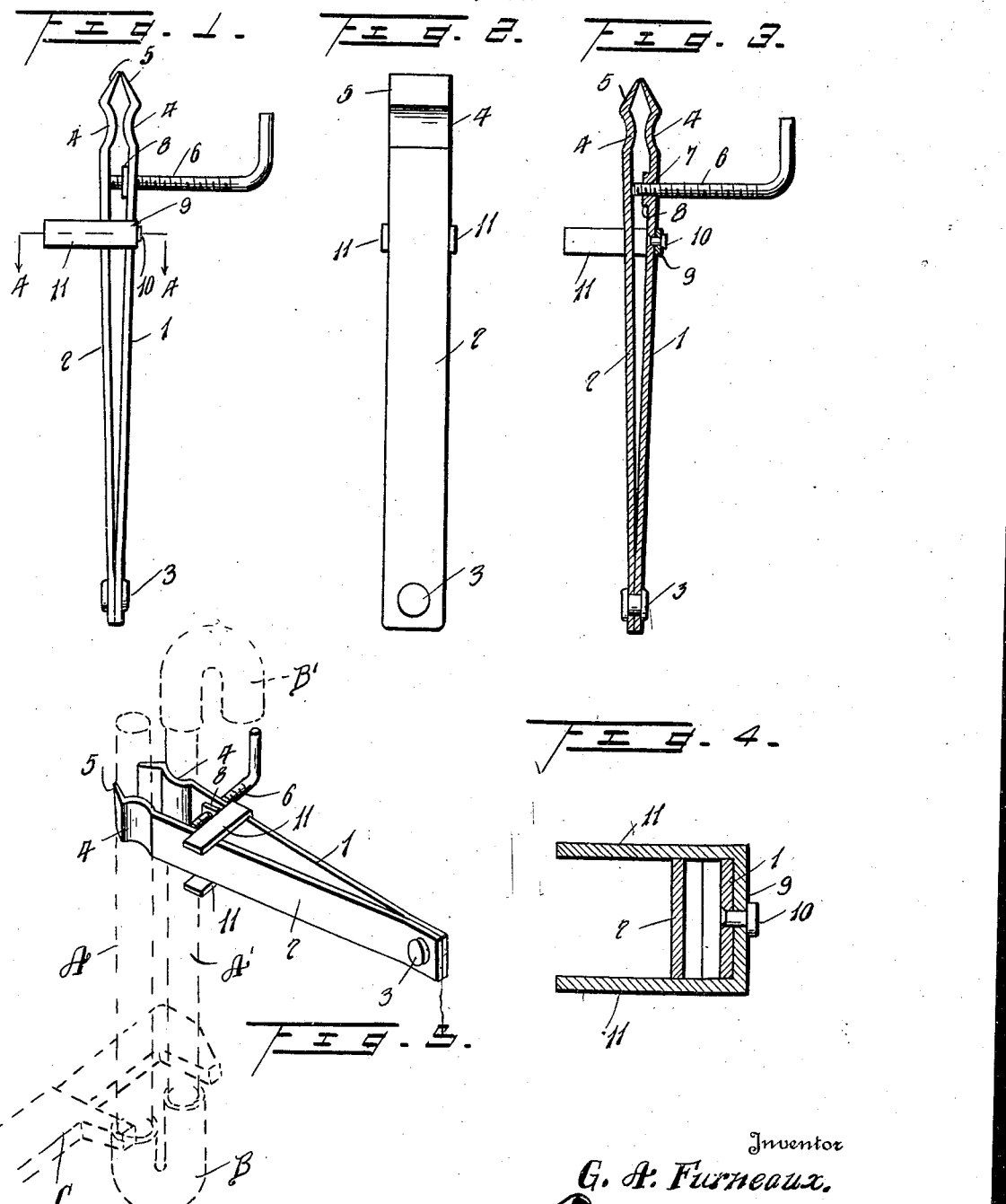

1,676,434

UNITED STATES PATENT OFFICE.

GEORGE A. FURNEAUX, OF THE DALLES, OREGON.

SPREADER FOR DISTANCING SPACED PIPES AND THE LIKE.

Application filed March 8, 1927. Serial No. 173,732.

The invention relates to spacing or spreading devices for use in distancing pipes for the application of joint members thereto.

In assembling water coils and the like comprising a series of lengths having the ends of adjacent pipes connected by means of return couplings, it is necessary that the ends of the pipes be spread so as to permit screwing the return couplings on one of the adjacent pipes. It is the present practice to employ wedges, the pointed ends of cold chisels or the like to hold the pipes separated while the return coupling is being screwed on or to pry them apart with other tools, but by this practice the return couplings are frequently broken on the other ends of the pipes.

It is the object of my invention to provide means for spreading the adjacent pipes without endangering the return coupling on the other ends of the pipes to be spread comprising a tool having a pair of spring arms secured together through one of their ends and having their free ends provided with recesses to receive the pipes to be spread and having a screw threadedly engaging one of the arms and its end abutting the other arm, said screw being actuable to spread the arms apart and with them the pipes.

The invention will be described hereinafter and will be found illustrated in the accompanying drawings in which Figure 1 is a plan view of the improved spreader, Figure 2, a side view, Figure 3, a central longitudinal sectional view, Figure 4, a transverse sectional view on a plane indicated by the line 4—4 of Figure 1, and Figure 5 is a view in perspective showing the application of the device.

In the drawings similar reference characters will be used to designate corresponding parts throughout the several views.

The improved pipe spreader comprises two arms 1 and 2 made of spring steel that are joined together adjacent to one of their ends as indicated by a rivet 3, while adjacent to their other ends are provided concaved recesses 4 that are adapted to engage the pipes to be spread. The free ends of the arms 1 and 2 are tapered and inclined toward one another as shown at 5 so that when the arms are relaxed the tapered ends 5 engage one another thus forming a wedge to assist in inserting the device between the pipes to be spaced. A screw 6 threadedly engages through an opening 7 in arm 1 and has its end abutting the surface of the arm 2, arm 1 being thickened surrounding the threaded opening 7 as shown at 8 to strengthen the engagement of the screw 6 with said arm, it being understood that by actuating the screw 6 the arms may be spread or relaxed as may be desired. Secured to arm 1 is a U-shaped member 9 by means of a rivet 10 secured through the bight of said U-shaped member and through the arm 1, the legs of said U-shaped member 9 designated 11 straddling the two arms 1 and 2 and serving as guides for the arm 2 relatively to the arm 1 to prevent lateral displacement thereof while being used.

In Figure 5 is shown the spreader in operation on a pair of pipes designated A and A', said pipes being connected at one of their ends by a return coupling B, the free ends of the pipes being spread by the device hereinbefore described to admit of screwing the return coupling B' onto the ends of one of the pipes, designated A'. To protect the return coupling B from injury while the pipes A and A' are being spread, it is good practice to employ a vise or a wrench to hold the pipes A and A' from spreading adjacent to the coupling B, a wrench C being suggested in Figure 5 and in proper position to perform the function stated.

It will be furthermore understood that the invention is not limited to securing the arms 1 and 2 together by means of a rivet as hereinbefore stated, but that any other means for accomplishing this may be substituted, such for instance as welding, without affecting the spirit of the invention, and that the U-shaped member 9 may be omitted when the arms are secured together by welding except where so limited in the appended claims.

What is claimed is:—

1. A spreader for distancing spaced pipes and the like, comprising spring arms secured together and having recesses opening outwardly of the arms to seat between articles to be distanced, and a screw threadedly engaging one of said arms and terminally engaging the other arm.

2. A spreader for distancing spaced pipes and the like, comprising spring arms secured together at one of their ends and having recesses opening outwardly of the arms to seat between articles to be distanced, a screw threadedly engaging one of said arms, the other arm sustaining the thrust of the screw, and a guide secured to one of the arms and engaging the other arm.

3. A spreader for distancing spaced pipes and the like, comprising spring arms secured together through one of their ends and having recesses adjacent their free ends, a screw threadedly engaging one of said arms, the other arm sustaining the thrust of the screw, and a U-shaped member secured to one arm through the bight thereof and straddling the other arm and providing a guide therefor.

4. A spreader for distancing spaced pipes and the like, comprising spring arms secured together at one of their ends and having recesses opening outwardly of the arms to seat between articles to be distanced, the free ends of said arms inclined towards one another and tapered and engaging when the arms are relaxed forming a wedge to assist in inserting the arms between articles to be spaced, and a screw threadedly engaging one of the arms and having a thrust engagement with the other arm.

In testimony whereof I affix my signature.

GEORGE A. FURNEAUX.